2,922,768
Patented Jan. 26, 1960

2,922,768

PROCESS FOR POLYMERIZATION OF A VINYL-
IDENE MONOMER IN THE PRESENCE OF A
CERIC SALT AND AN ORGANIC REDUCING
AGENT

Guido Mino and Samuel Kaizerman, Plainfield, N.J.

No Drawing. Continuation of application Serial No.
628,212, December 14, 1956, which is a continuation
of application Serial No. 623,556, November 21, 1956.
This application August 7, 1959, Serial No. 832,164

41 Claims. (Cl. 260—17.4)

This invention relates to a process for polymerizing a polymerizable monomeric compound containing a polymerizably reactive $CH_2=C<$ group in an aqueous medium at a pH not greater than 3.5 in the presence of certain organic reducing agents and a ceric salt which is soluble in at least one component of the reaction medium. Still further, this invention relates to an aqueous solvent polymerization process wherein a vinyl or vinylidene monomer which is at least partially soluble in water is polymerized in the presence of certain organic reducing agents and in the presence of a ceric salt which is soluble is at least one component of the reaction medium wherein the pH of the aqueous medium is maintained at 3.5 or below. Still further, this invention relates to the process of polymerizing in an aqueous emulsion, a polymerizable vinyl or vinylidene monomer at a pH not greater than 3.5 in the presence of a ceric salt which is soluble in at least one component of the reaction medium and certain organic reducing agents. Still further, this invention relates to the polymerization products produced which comprise a substantially pure polymeric inter-reaction product of a polymerizable monomer that contains a polymerizably reactive $CH_2=C<$ group and an organic reducing agent which is capable of being oxidized by said ceric salt and which is capable of initiating the polymerization. Still further, this invention relates to a process for preparing graft polymers comprising polymerizing a polymerizable monomeric compound containing a polymerizably reactive $CH_2=C<$ group in an aqueous medium at a pH not greater than 3.5 and in the presence of a polymeric organic reducing agent and a ceric salt which is soluble in at least one component of the reaction medium.

One of the objects of the present invention is to polymerize a vinylidene monomer in the presence of certain organic reducing agents and a ceric salt that is soluble in at least one component of the reaction medium wherein the polymerization reaction is carried out in an aqueous medium at a pH not greater than 3.5. A further object of the present invention is to polymerize a vinylidene monomer in the presence of an organic reducing agent which is capable of entering into the reaction with and initiating the polymerization of the vinylidene monomer as well as being capable of being oxidized by ceric salts in an aqueous emulsion medium at a pH not greater than 3.5. A further object of the present invention to to prepare graft polymers by polymerizing a vinylidene monomer in the presence of a polymeric organic reducing agent which is capable of entering into the reaction with and of initiating the polymerization of said monomer as well as being capable of being oxidized by ceric salts in an aqueous medium at a pH not greater than 3.5. These and other objects of the present invention will be discussed in greater detail hereinbelow.

This application is a continuation application of our earlier applications having the Serial Nos 623,556, filed November 21, 1956, and 628,212, filed December 14, 1956, both now abandoned, entitled "Process for Polymerizing Vinylidene Monomer in the Presence of a Ceric Salt and an Organic Reducing Agent and the Product Thereby Obtained" and "Process for Polymerization and the Products Produced Thereby," respectively. Each of these earlier applications were continuation-in-part applications of our earlier application having the Serial No. 577,641, filed April 12, 1956, now abandoned, entitled "Process for Polymerization and the Products Produced Thereby," wherein we have disclosed a process for polymerizing vinyl and/or vinylidene monomers in the presence of certain reducing agents and a ceric salt and the products produced through such a process.

In the practice of the process of the present invention, the polymerization is carried out in aqueous solution or an aqueous emulsion as contrasted with other solvent polymerization processes such as organic solvent polymerization or even bulk polymerization. Inasmuch as the process of the present invention may be carried out in an aqueous solvent medium or in an aqueous emulsion medium, it is immaterial as to whether or not the polymerizable monomeric vinylidene or vinyl compound is water soluble. If the polymerizable material is completely water soluble, one need not resort to use of an emulsion system. On the other hand, if the polymerizable monomer is only partly soluble in water, one may find that the polymerization can be carried out in an aqueous solvent medium, without benefit of an emulsifying agent, by means of a dispersing agent or by use of a dispersing technique such as rapid agitation wherein the monomeric material, the reducing agent and the ceric salt have ample opportunity to come into reactive contact with one another to produce the desired polymerization product. For monomeric materials that are only slightly soluble in water or are substantially completely insoluble in water, the emulsion polymerization technique is recommended.

In carrying out the process, it is imperative to use at least one of a class of certain organic reducing agents as described briefly hereinabove and discussed more fully hereinbelow and a ceric salt which is soluble in at least one component of the reaction medium, namely, for instance in the vinylidene monomer and/or the organic reducing agent and/or water.

Among the monomeric polymerizable compounds which may be used in the practice of the process of the present invention are those containing a polymerizable $CH_2=C<$ group. This includes vinylidene compounds and/or vinyl compounds. More specifically, the following polymerizable monomers may be used: styrene, and substituted styrenes such as ring-substituted and side chain substituted styrenes, e.g., α-chlorostyrene, α-methylstyrene, and the like, o-methylstyrene, m-methylstyrene, p-methylstyrene, 2,4-dimethylstyrene, 2,5-dimethylstyrene, 2,4,5-trimethylstyrene, p-ethylstyrene, o-bromostyrene, 2-bromo-4-ethylstyrene, p-isopropylstyrene, p-chlorostyrene, 2,4-dichlorostyrene, or polymerizable acrylic compounds, such as acrylic acid and its homologs such as methacrylic acid, α-methacrylic acid, α-chloroacrylic acid and the like and derivatives thereof such as the anhydrides, amides, and nitriles, and the acrylic type acid esters of monohydric alcohols such as the methyl, ethyl, propyl, butyl, isobutyl, amyl, hexyl, cyclohexyl, heptyl, octyl, decyl alcohols or the acrylic type acid esters of nitro alcohols such as 3-nitro-2-butanol, 2-nitro-3-hexanol, 2-methyl-2-nitro-1-butanol and 2-nitro-2-methylpropyl alcohol, and the acrylic type acid esters of polyhydric alcohols such as ethylene glycol, diethylene glycol, glycerol, pentaerythritol, dipentaerythritol, propylene glycol, dipropylene glycol and the like. Additionally, one may make use of such polymerizable monomers such as butadiene, isoprene and haloprenes such as chloroprene. Still further, as the polymerizable monomer, one may use allyl compounds such as allyl alcohol or allyl or substituted allyl esters such as methallyl esters. More specifically, one may use allyl acetate, allyl propionate, allyl chloroacetate, allyl caproate, allyl linoleate, allyl benzoate, methallyl acetate, the allyl ester of isobutyric acid, allyl acrylate, diallyl carbonate, diallyl oxalate, diallyl phthalate, diallyl maleate, triallyl cyanurate and the like. Still further, one may make use of the vinyl or vinylidene esters such as vinyl acetate, vinyl chloride, vinylidene chloride, vinyl propionate, vinyl butyrate, and the like. Vinyl ethers may also be used such as vinylethylether, vinylpropylether, vinylisobutylether and the like or other vinyl compounds such as divinylsulfone, divinylsulfide, vinyl pyridine and the like. Additionally, one may make use of the unsaturated polymerizable amides such as acrylamide, methacrylamide, ethacrylamide, methylene bisacrylamide and the like, or the nitriles such as acrylonitrile, methacrylonitrile, ethacrylonitrile, alpha-chloro-acrylonitrile and the like. Whenever desirable, these polymerizable monomers may be used either singly or in combination with one another.

In the practice of the present invention, it is imperative that an organic reducing agent be used which is capable of being oxidized by the ceric salt which is present in the system and which is capable of initiating the polymerization of the compound containing the $CH_2=C<$ group. These reducing agents have been described in our earlier applications as compounds containing the

group wherein X is a member selected from the group consisting of OH, RCO, SH and NHR; wherein R is a member selected from the group consisting of hydrogen, alkyl, aralkyl and aryl. Fundamentally, this description of the class of reducing agents encompasses such classes of compounds as alcohols, or compounds containing an alcoholic hydroxy group, ketones, mercaptans, amines and the like. Additionally, it was indicated that aldehydes could be used, as well as esters, amides, acetals and acids. Additionally, acid anhydrides may be used. The open bonds in the

compounds are organic residues and/or in one instance only, hydrogen. Thus, for example, they may be alkyl, both substituted and unsubstituted, aralkyl, both substituted and unsubstituted and hydrogen or any combination of these groups. These organic groups or any combination thereof may be substituted or unsubstituted and if substituted, may contain, for instance, such substituent groups as nitro, amino, hydroxyl, carboxyl, carbonyl, halo, alkoxy, alkyl, amino, carboxy, sulfo, phospho and mercapto groups, individually, in plurality or admixtures thereof.

In our earlier application having the Serial No. 623,556, we have indicated that these organic reducing agents are monomeric reducing agents as contrasted with the polymeric reducing agents disclosed and claimed in our earlier application having the Serial No. 628,212. The monomeric reducing agents as disclosed in said earlier application and reiterated hereinbelow are low molecular weight organic reducing agents which may or may not be polymerizable whereas the polymeric reducing agents are clearly polymeric in character even though they may be low order polymers such as dimers, trimers and higher polymeric materials, both natural and synthetic.

Some of the compounds suitable for use as reducing agents according to the present invention are classed as monomeric reducing agents. These monomeric reducing agents function to initiate polymerization and as connecting links or members in the formation of linear oligo block polymers which are defined as block copolymers composed of a few blocks in relatively long sequences having a degree of polymerization equal to about 50 monomer units or more as opposed to conventional block copolymers which are formed of a number of relatively short sequences such as those having a degree of polymerization significantly less than 50 monomer units, joined together through reactive end groups.

On the other hand, the remaining reducing agents used in the practice of the process of the present invention are classed as polymeric reducing agents, which term is intended to include dimers, trimers and higher polymeric materials, both natural and synthetic, as indicated hereinabove. These polymeric reducing agents are reactive in the system and become a part of the ultimate polymeric reaction product produced. These reducing agents will constitute backbones or blocks to which the vinylidene and/or vinyl monomer used in the present invention are readily attached to form graft copolymers or linear oligo block copolymers. By oligo block copolymers, as the term is used herein, is meant block copolymers composed of a few blocks of relatively long sequences having a degree of polymerization equal to 50 monomer units or more as opposed to conventional block copolymers formed of a large number of relatively short sequences having a degree of polymerization of less than 50 monomer units joined together through reactive end groups. Among the materials which are effective as preformed polymeric reducing agents adapted for use as backbones or blocks in the formation of graft copolymers or linear oligo block copolymers in accordance with the present invention are compounds containing one or more alcoholic hydroxy groups. Illustrative of this class of polymeric reducing agents are polyvinyl alcohol, partial esters of polyvinyl alcohol, as for example, formylated polyvinyl alcohol, acetylated polyvinyl alcohol, sulfated polyvinyl alcohol, nitrated polyvinyl alcohol, and the like; partial ethers of polyvinyl alcohol as cyanoethylated polyvinyl alcohol, celluose, including cotton, viscose, cuprammonium rayon, partial esters of cellulose such as cellulose acetate, cellulose propionate, celulose nitrate and the like; partial ethers of cellulose such as methyl cellulose, ethyl cellulose, hydroxy ethyl cellulose, cyanoethylated cellulose and the like; starch, partial ethers of starch, as for example, cyanoethylated starch, partial esters of starch, as for example, acetylated starch; poly β-hydroxy ethyl methacrylate and copolymers thereof, and poly β-hydroxy ethyl acrylate and copolymers thereof and the like.

Among the monomeric alcohols which may be used in the practice of the present invention are the monohydric and polyhydric alcohols. Primary, secondary and tertiary alcohols may be used. More specifically, one can make use of methanol, ethanol, propanol, butanol, octadecanol, phenylethyl alcohol, phenylpropyl alcohol, chloro-phenylethyl alcohol, isopropanol, 1,3-dichoropropanol-2, 1-phenylpropanol-2, 1-(chlorophenyl)propanol-2, or the glycols, such as ethylene glycol, diethylene glycol, propylene glycol, dipropylene glycol, trimethylene glyco and other polyhydric alcohols such as glycerol, mannitol, Carbitol, pinacol, sorbitol and the alkandiols, such as 1,4-butandiol, 1,3-butandiol, 1,5-pentandiol, 2,3-pentandiol, 1,3-pentandiol and alkoxy alcohols such as ethoxy ethanol ethoxy propanol, butoxy propanol, or aroxy alcohols such as phenoxy ethanol and the like. Mono and diglycerides may additionally be used such as the glycerol monopropionate and the like.

As reducing agents in the present invention, one may use the ketones. As monomeric ketones, one may utilize for instance, acetone, methylethyl ketone, diethyl ketone, methylpropyl ketone, ethylpropyl ketone, dipropyl ketone, or derivatives thereof such as methylacetoacetate, ethylacetoacetate, propylacetoacetate, 1-phenyl butanone-3 and the like. Among the polymeric ketones which may be used in the practice of the process of the present invention are polyvinyl pyrrolidone, polymethylvinyl ketones, polyethylvinyl ketones, polypropylvinyl ketones and copolymers prepared by polymerizing alkyl vinyl ketones with other polymerizable materials such as those vinylidene and/or vinyl monomers recited hereinabove.

Among the monomeric mercaptans that may be used as reducing agents in the process of the present invention are methyl mercaptan, ethyl mercaptan, n-propyl mercaptan, isopropyl mercaptan, 2-mercaptobutane, n-butyl mercaptan, n-decyl mercaptan, lauryl mercaptan, phenylethyl mercaptan and the like. Furthermore, tertiary butyl, tertiary amyl, tertiary octyl mercaptan or the like may be employed. Examples of the polymeric mercaptans which may be used in the practice of the process of the present invention are poly mercaptoethyl acrylate, poly mercaptobutyl acrylate, poly mercaptoethyl methacrylate, poly mercaptopropyl acrylate, poly mercaptopropyl methacrylate, and the like or copolymers of mercapto ethyl acrylate, mercaptobutyl acrylate, mercaptoethyl methacrylate, mercaptopropyl acrylate, mercaptopropyl methacrylate and the like with other polymerizable materials containing a polymerizable $CH_2=C<$ group as recited hereinabove.

Among the monomeric amines which may be used as reducing agents in the practice of the process of the present invention are methylamine, ethylamine, n-propylamine, n-butylamine, 2-phenylethylamine, and the like. Polyamines may also be used such as ethylene diamine, trimethylene diamine, diethylene triamine, tetraethylene pentamine, triethylene tetramine and the like. The polymeric amines used in the practice of the process of the present invention are the polyvinyl amines which can be prepared from polyacrylamide and from acrylamide copolymers by treatment with NaOCl by the Hoffman degradation reaction.

The monomeric aldehydes may also be used as reducing agents including such aldehydes such as formaldehyde, acetaldehyde, propionaldehyde, butyraldehyde, phenyl propionaldehyde, heptaldehyde, and materials engendering monomeric aldehydes such as trioxymethylene, paraformaldehyde, and the like. Examples of the polymeric aldehydes which may be used in the practice of the process of the present invention are homopolymers such as polyacrolein, poly 3-butenal, poly 3-pentenal, poly 5-chloro-3-pentenal and the like or copolymers prepared by polymerizing acrolein, 3-butenal, 3-pentenal, 5-chloro-3-pentenal and the like with other polymerizable materials containing the $CH_2=C<$ group such as those recited hereinabove.

The monomeric acetals may be used as reducing agents in the process of the present invention such as dimethyl acetal, diethyl acetal, dipropyl acetal, formal, diethyl formal, dipropyl formal, dimethyl butyral, diethyl butyral and the like. Additionally, one may make use of the hemiacetals as the monomeric reducing agent such as methyl formaldehyde hemiacetal, ethyl formaldehyde hemiacetal, methyl acetaldehyde hemiacetal, propyl acetaldehyde hemiacetal, methyl butyraldehyde hemiacetal, propyl butyraldehyde hemiacetal and the like. Among the polymeric acetals which may be used in the practice of the process of the present invention are polyvinyl formal, polyvinyl acetal, polyvinyl butyral, and the like.

Malonic acid and homologues thereof, such as, for example, ethyl malonic acid, propyl malonic acid, butyl malonic acid, isosuccinic acid, and the like are suitable for use as reducing agents. Various amides such as malonamide, ethyl malonamide, propyl malonamide, chloromalonamide, isosuccinamide, may be used. In addition, various esters such as ethyl malonate, methyl isosuccinate, propyl malonate, ethyl ethylmalonate are suitable. Furthermore, nitriles such as malononitrile, isosuccinonitrile, ethyl malononitrile, propyl malononitrile, isobutyl malononitrile may be employed. Various compounds which have more than one kind of activating group, such as, for example, cyanoacetic acid, alpha-cyanopropionic acid, methyl cyanoacetate, ethyl cyano- butyrate, cyanoacetamide, alpha - cyanopropionamide, malonamic acid and the like may also be used.

Obviously, these monomeric reducing agents may be employed singly or in combination with one another.

Certain polymerizable monomers contain the group

as hereinabove defined and can, therefore, act as both reducing agent and monomer in the polymerization reaction. Examples of such compounds are allyl alcohol, methallyl alcohol, acrolein, β-methacrolein, β-hydroxyethyl acrylate, β-hydroxymethacrylate, methyl vinyl ketone, ethyl vinyl ketone, propyl vinyl ketone, and the like.

When the monomeric reducing agent is also a polymerizable material, it should be different from the other polymerizable material containing the $CH_2=C<$ group. Otherwise, simple homopolymerization will take place which is not within the purview of this invention. If the monomers are different but each contains the

group, rapid simple homopolymerization or copolymerization will occur. As a consequence, the polymerizable monomer containing the $CH_2=C<$ group should be devoid of the

group and the like as it is defined herein.

The reaction process of the present invention may be carried out at temperatures between about −5° C. and 100° C. but preferably at temperatures between about 10° C. and 50 or 60° C. Temperatures significantly above 70° C. are to be avoided as a general rule because the redox system sometimes decomposes too rapidly at these temperatures.

The process of the present invention may be carried out under pressure or under partial vacuum but it is preferred to utilize atmospheric pressure inasmuch as the reaction runs very favorably at this pressure.

The process of the present invention may be carried out at any pH value up to about 3.5. Extremely low pH values are operable as evidenced by polymerization as shown in the subsequent examples. The pH value is maintained between 1 and 2 in aqueous polymerization reactions for optimum results. If the polymerization involves the use of an emulsion system and a polymeric reducing agent, the pH value can be as high as 6 but still preferably below 3.5.

The amount of ceric compound which is utilized in the practice of the process of the present invention may be varied over fairly wide limits. For example, one may utilize from about $10^{-6}$ to $10^{-1}$ mole of ceric ion per mole of polymerizable monomer. Preferably, one would use between $10^{-3}$ to $10^{-2}$ mole of ceric ion per mole of polymerizable monomer. Ceric ion is preferably introduced into the reaction mixture according to the present invention in the form of ceric salt. Among the salts adapted for use in the present invention are ceric nitrate, ceric sulfate, ceric ammonium nitrate, ceric ammonium sulfate, ceric ammonium pyrophosphate, ceric iodate, ceric salts of organic acids, e.g., cerium naphthenate and cerium linoleate and the like. These compounds may be employed singly or in combination with one another. Ceric compounds which are capable of forming ceric salts in situ under the acid conditions of the polymerization reaction such as ceric oxide, ceric hydroxide and the like may be used.

In the practice of the process of the present invention, when an aqueous emulsion technique is used, one will choose to make use of an emulsifying agent of which there are many known in the art. Inasmuch as the process of the present invention including the aqueous emulsion processes are preferably carried out at pH values not greater than 3.5, it is preferred to make use of those emulsifying agents which do not tend to precipitate from an acid medium particularly, one within the pH range of operation. Among the emulsifying agents which may be used in the process of the present invention, are the sodium dialkyl sulfosuccinates such as the sodium diisobutyl sulfosuccinate, sodium diamyl sulfosuccinate, sodium dihexyl sulfosuccinate, sodium dioctyl sulfosuccinate, sodium ditridecyl sulfosuccinate and the like, or one may use the sodium alkyl, aryl sulfonates such as sodium octyl benzene sulfonate, sodium decyl benzene sulfonate, sodium isopropyl naphthalene sulfonate and the like. Additionally, one may use the sodium alkyl sulfates such as sodium lauryl sulfate or sulfonated mineral oils may be used. The salts other than the sodium may be used; for instance, the potassium salts, the lithium salts and the like. Quite obviously, these emulsifying agents may be used either singly or in combination with one another. The amount of emulsifying agent used will depend in some measure on the degree of water insolubility of the components used in the reaction, namely the vinylidene monomer, the organic reducing agent and the ceric salt. At any rate, the amounts conventionally used as a range will find adequate application in the practice of the present invention.

In the practice of the present invention, one may make use of inorganic ceric salts or organic ceric salts such as the oil soluble ceric salts. For the purposes of this invention, these oil soluble ceric salts may be formed in situ or they may be used as a preformed oil soluble ceric salt. In order to prepare these oil soluble ceric salts, one reacts an inorganic ceric salt such as ceric ammonium nitrate with an organic sulfur containing acid. These organic sulfur containing acids may be either monobasic or polybasic, saturated or unsaturated, aliphatic or aromatic. Illustrative of these acids are the following: the mono and disulfosuccinic acids, sulfochlorsuccinic acid, sulfoadipic acid, sulfopyrotartaric acid, sulfoglutaric acid, sulfosuberic acid, sulfosebacic acid, sulfomaleic acid, sulfofumaric acid, sulfodimethyl succinic acid, sulfomethylgulutaric acid, sulfomalonic acid, sulfopropylsuccinic acid, sulfooctylglutaric acid, and the like. Still further, the alkyl esters of these sulfocarboxylic acids such as the methyl, ethyl, propyl, butyl, amyl, hexyl, octyl esters and the like may be used. Additionally, one may make use of the monoalkyl esters of sulfuric acid such as monobutyl acid sulfate, monoamyl acid sulfate, monooctyl acid sulfate, monolauryl acid sulfate and the like. Additionally, one may make use of the alkyl benzene sulfonates such as the octyl benzene sulfonate, nonyl benzene sulfonate, decyl benzene sulfonate, dodecyl benzene sulfonate, octadecyl benzene sulfonate, isopropyl naphthalene sulfonate and the like. These organic sulfur-containing acid materials are preferably used as alkali metal salts in reaction with the ceric ammonium nitrate to form the organic oil soluble ceric salts. The preferred alkali metal is sodium although others such as potassium, lithium and the like may be used.

Due to the characteristics of the ceric ion, the ultimate oil soluble ceric product may be classed as a salt or as a complex.

Among the oil soluble ceric salts which may be produced in accordance with the process outlined hereinabove are ceric dihexyl sulfosuccinate, ceric dioctyl sulfosuccinate, ceric diheptyl sulfoglutarate, ceric didecyl sulfosuberate, ceric dilauryl sulfosebacate, ceric diamyl sulfomaleate, ceric dimethyl sulfofumarate, ceric dibutyl sulfodimethylsuccinate, ceric dilauryl sulfomethylglutarate and comparable ceric salts which can be produced by reacting any of the sodium salts of the organic sulfur containing acid compounds listed hereinabove with ceric ammonium nitrate.

In general, the time required to achieve a desired degree of polymerization may be determined empirically. Thus, for example, a given polymer may be precipitated at different time intervals and the extent of polymerization determined gravimetrically to determine the percent of the conversion of monomer to polymer. Where the amount of ceric ion and monomer is known, suitable reaction times may be readily established to achieve the desired degree of polymerization. In addition, the ceric ion when being reduced undergoes a color change from yellow to brown to a substantially colorless state, at which time it is substantially completely reduced and will no longer effectively initiate polymerization. Thus, in an aqueous system, an operator is readily able to determine when the reaction has gone to substantial completion.

Should it be desirable to halt the reaction at any given time, while ceric ion is still present in the reaction mixture, this may be done by the addition of hydroquinone, sodium sulfite or ferrous sulfate, which materials exhaust the remaining ceric ion substantially instantaneously, thus halting the reaction. Furthermore, as an additional method of halting the reaction, the pH of the reaction mixture may be adjusted to the alkaline side, as for example, to a pH of between 7 and 8, to precipitate out the remaining portion of the ceric compound, prohibiting its further reduction, thus stopping the reaction.

The amount of reducing agent to monomeric material may be varied extensively depending on the properties of the ultimate product desired. As a consequence, large excesses of either material may be utilized in alternative reactions.

The organic reducing agent used in the present invention may be employed in amounts from 0.01% to 1000% based on the weight of monomer utilized. For non-polymeric reducing agents, otherwise referred to as monomeric reducing agents, the amount may be varied from about 0.01% to 100% based on the weight of the monomer and preferably from about 0.1% and 10% based on the weight of the monomer. The polymeric reducing agents may be employed in amounts from 1% to 1000% or even more by weight based on the weight of the monomer and preferably from about 10% to 300% by weight based on the weight of the polymerizable monomer.

Referring now to the concept of grafting of polymer onto a preformed polymeric backbone, the number of such grafts on a given backbone may be controlled by controlling the amount of ceric ion added to the reaction mixture. Thus were a large amount of ceric ion to be added to a given reaction mixture, instead of one such grafted side chain, a number of such chains could be formed, theoretically, at least, at any point on the backbone where the active group of the polymeric reducing agent identified above is found. The length of the polymeric chain is a function of the monomer concentration, ceric ion concentration, temperature and chain transfer constant of the backbone.

In order that the concept of the present invention may be more fully understood, the following examples are set forth in which all parts are parts by weight unless otherwise indicated. These examples are set forth primarily for the purpose of illustration and any specific enumeration of detail contained therein should not be interpreted as a limitation of the case except as is indicated in the appended claims.

Example 1

Three 5-part samples of acrylamide, recrystallized from ethyl acetate, were dissolved in 50 parts of distilled water in screw cap jars. To the first and second samples were added 0.25 and 0.2 part of mannitol, respectively. In the third sample, no reducing agent was present. To each sample was then added $2 \times 10^{-4}$ mole of ceric ammonium nitrate as an 0.1 N-aqueous solution of ceric ammonium nitrate in molar nitric acid. The solutions were flushed with carbon dioxide and polymerized at 25° C. for 1 hour. The results obtained are set forth in the table below:

| Ceric Nitrate, Moles | Mannitol, parts | Time, Minutes | Percent Conversion |
|---|---|---|---|
| $2 \times 10^{-4}$ | 0 | 60 | 5 |
| $2 \times 10^{-4}$ | 0.25 | 60 | 92 |
| $2 \times 10^{-4}$ | 0.20 | 60 | 91 |

It can readily be seen that the absence of mannitol in the polymerization system at room temperature resulted in a negligible conversion of monomer to polymer.

*Example 2*

Seven samples of acrylonitrile, purified by steam distillation over 5% phosphoric acid and dried over sodium sulfate were dissolved in distilled water in 7 suitable reaction vessels. Ceric ammonium nitrate, organic reducing agents (specified below) and nitric acid in an amount sufficient to adjust the pH to 1.5 where then added in proportions set forth in the table below. These solutions were then flushed with carbon dioxide and polymerized at 25° C.

| Ceric Ammonium Nitrate, Moles | Reducing Agent Parts | Acrylonitrile, Parts | Water, Parts | Time, Min. | Conversion, Percent |
|---|---|---|---|---|---|
| $2 \times 10^{-4}$ | None | 2.5 | 50 | 60 | 10 |
| $2 \times 10^{-4}$ | 1 acetone | 2.5 | 50 | 60 | 38 |
| $2 \times 10^{-4}$ | 1 ethanol | 2.5 | 50 | 60 | 70 |
| $2 \times 10^{-4}$ | 0.25 mannitol | 2.5 | 50 | 60 | 70 |
| $2 \times 10^{-3}$ | None | 20 | 400 | 30 | 0 |
| $2 \times 10^{-3}$ | 0.65 1,3-dichloro-2-propanol | 20 | 400 | 30 | 80 |
| $2 \times 10^{-3}$ | 0.26 1,3-dichloro-2-propanol | 20 | 2 | 45 | 94 |

The results indicate that mannitol, ethanol and dichloro propanol increases the percent of conversion of monomer to polymer in the system here illustrated. Acetone, it will be observed, was somewhat less effective.

*Example 3*

15 parts of methyl acrylate, inhibitor free, were dissolved in 350 parts of distilled water. The solution was flushed with carbon dioxide and 0.5 parts of mannitol and $5 \times 10^{-4}$ mole of ceric ammonium nitrate were added. Sufficient nitric acid was then added to adjust the pH of the system to 1.5. Polymerization started immediately and the polymer precipitated as a rubbery mass. After 75 minutes at room temperature, the conversion was 88%. The resulting polymer was soluble in benzene, acetone and chloroform.

*Example 4*

Into a suitable reaction vessel containing 100 parts of water at 15° C., there is introduced 5 parts of methylacrylate and 0.5 part of propionaldehyde. Stirring accomplishes solution. The solution is then flushed with carbon dioxide after which 4 parts of 0.1 N solution of ceric ammonium nitrate in molar nitric acid are added. Polymerization starts immediately with polymeric material precipitating as a rubbery mass. The yield of polymer after 30 minutes of reaction is 3.6 parts representing a conversion of about 72%.

*Example 5*

A solution of 1.5 parts of acrylonitrile and 0.1 part of malonic acid in 25 parts of water are introduced into a suitable reaction vessel and the solution is flushed with carbon dioxide and then cooled to about 5° C. To this solution there is added 1.5 parts of 0.1 N solution of ceric ammonium sulfate in 1 N sulfuric acid. After about 45 minutes, the yield of polymer is 1.18 parts which represents a conversion of about 79%.

*Example 6*

Into a suitable reaction vessel, there is introduced 6 parts of acrylonitrile and 0.5 part of tertiary butyl mercaptan together with 100 parts of water at 25° C. The mixture was stirred thoroughly to accomplish solution and after flushing the same with carbon dioxide, 5 parts of 0.1 N solution of ceric ammonium nitrate in molar nitric acid are added. Polymerization started within about 2 minutes. After about one hour, the polymer slurry is dispersed in 200 parts of water and the polymer is separated by filtration. The yield is about 4.85 parts which represents a conversion of about 81%.

*Example 7*

Into a suitable reaction vessel containing 50 parts of water, there is introduced 3.5 parts of acrylonitrile and 0.3 part of n-butylamine. The pH of the solution is adjusted to 1.5 with nitric acid. After flushing the reaction zone with nitrogen, 0.1 part of ceric ammonium nitrate is added. The polymerization started in about one minute and after 45 minutes at room temperature, the yield of polymer is 2.66 parts representing a conversion of about 76%. The polymer is soluble in dimethylformamide and dimethylsulfoxide.

*Example 8*

A solution of 1.5 parts of acrylonitrile and 0.1 part of diethyl malonate and 25 parts of water was flushed with carbon dioxide and cooled to 20° C. To this solution, 1.5 parts of 0.1 N solution of ceric ammonium nitrate and N nitric acid were added. After 45 minutes, a high yield of polymer was obtained.

*Example 9*

A solution of 3.0 parts of acrylonitrile and 0.2 part of malonamide and 50 parts of water was flushed with carbon dioxide and cooled to 5° C. To this solution, 3.0 parts of 0.1 N solution of ceric ammonium sulfate and N sulfuric acid were added. After 45 minutes, a high yield of polymer was obtained.

*Example 10*

A solution of 4.5 parts of acrylonitrile and 0.3 part of malonic acid and 75 parts of water was flushed with carbon dioxide and cooled to 5° C. To this solution, 4.5 parts of 0.1 N solution of ceric ammonium sulfate and N sulfuric acid were added. After 45 minutes, a high yield of polymer was obtained.

*Example 11*

A solution of 1.5 parts of acrylonitrile and 0.1 part of malononitrile and 25 parts of water was flushed with carbon dioxide and cooled to 5° C. To this, 1.5 parts of 0.1 N solution of ceric ammonium sulfate and N sulfuric acid were added. After 45 minutes, a high yield of polymer was obtained.

*Example 12*

Into a suitable reaction vessel, there is introduced 10 parts of acrylamide and 1 part of ethyl lactate dissolved in 180 parts of water. After flushing the solution with nitrogen, there is added 5 parts of 0.1 N solution of ceric ammonium nitrate in molar nitric acid. The polymerization is carried out for about 1 hour at 25° C. after which the polymer is precipitated by pouring the solution into an excess of methanol. The yield of polymer was 8.25 parts.

*Example 13*

Into a suitable reaction vessel, there is introduced 7 parts of acrylonitrile and 0.5 part of pinacol hydrate dissolved in 100 parts of water maintained at 20° C. There is then added 4 parts of a 0.1 N solution of ceric ammonium sulfate in N sulfuric acid. Polymerization starts immediately and after about 40 minutes, the yield of polymeric material is 6.2 parts representing a conversion of 89%.

*Example 14*

Into a suitable reaction vessel, there is introduced 10 parts of methyl acrylate dissolved in 220 parts of water. There is then added 1.5 parts of a 35% aqueous solution of formaldehyde. After flushing with carbon dioxide, there is added 8 parts of a 0.1 N solution of ceric ammonium nitrate in molar nitric acid. After about 1 hour at 5° C., there is produced a rubbery polymer in a yield of 8.2 parts.

*Example 15*

Into a suitable reaction vessel, there is introduced 6 parts of acrylonitrile dissolved in 100 parts of water and there is then added 0.5 part of dibutyl acetal. The solution is flushed with nitrogen and there is then added 4 parts of a 0.1 N solution of ceric ammonium nitrate in molar nitric acid. The polymerization began within three minutes and after 90 minutes at 25° C., the yield of polymer was 4.45 parts.

*Example 16*

Into a suitable reaction vessel, there is introduced 4.5 parts of methyl acrylate and 0.5 part of tertiary butyl mercaptan dissolved in 100 parts of water. The temperature is adjusted to 25° C. After flushing the solution with nitrogen, 5 parts of molar nitric acid and 0.2 part of ceric ammonium nitrate are added. The polymerization began within 2 minutes and after 90 minutes, the yield of polymer was 4.0 parts which represents a conversion of 89%.

*Example 17*

Into a suitable reaction vessel, there is introduced 15 parts of purified acrylamide in 200 parts of oxygen-free water to which there is then added 1.5 parts of acetaldehyde. The solution is cooled to 15° C. and flushed briefly with carbon dioxide after which there is added 6 parts of a 0.1 N solution of ceric ammonium nitrate in molar nitric acid. After 80 minutes, the solution is poured into an excess of methanol in order to precipitate the polymer. The yield of polyacrylamide is 6.1 parts. The polymer contained aldehyde end groups and was suitable for use in the preparation of block polymers by reaction with a second polymerizable monomeric material using additional ceric ion.

*Example 18*

Into a suitable reaction vessel, there is introduced 6 parts of acrylonitrile and 0.5 part of ethylene diamine dissolved in 100 parts of water. The pH of the solution is adjusted to 1.5 with 6-molar nitric acid. After flushing the solution with nitrogen, 0.1 part of ceric ammonium nitrate is added. After 100 minutes at 23° C., the yield of polymer is 4.55 parts representing a conversion of 76%.

*Example 19*

Into a suitable reaction vessel equipped with thermometer and stirrer, there is introduced 100 parts of water, 2 parts of sodium dihexyl sulfosuccinate, 50 parts of styrene and 1 part of ethylacetoacetate. The air in the reaction vessel is displaced with nitrogen. After the reaction mixture is substantially completely emulsified by stirring, there is added 2 parts of a 0.1 N solution of ceric ammonium sulfate in N sulfuric acid. Polymerization is carried out for a period of about 4 hours at 40° C. Thereafter, the resulting latex is coagulated in an excess of 50:50 ethanol-acetone mixture. The yield of polymer is 34.5 parts.

*Example 20*

Into a suitable reaction vessel equipped as in the preceding example, there is introduced a mixture of 75 parts of water, 21 parts of chloroprene, 1.5 parts of sodium dihexyl sulfosuccinate and 1 part of propylene glycol, the mixture is emulsified by stirring. After displacing the air in the vessel with nitrogen, there is added 2 parts of a 0.1 N solution of ceric ammonium sulfate in N surfuric acid. Polymerization is allowed to proceed for 1 hour at 30° C. The resulting latex is coagulated in an excess of a 75:25 methanol-acetone mixture and the polymeric material is separated by filtration. The polymer yield is 17.8 parts.

*Example 21*

Five parts of acrylamide were added to 100 parts of water containing 5 parts of polyvinyl alcohol (Elvanol 51.05, a commercially available polyvinyl alcohol having a number average molecular weight of 10,000) in a screw cap jar. The solution was then flushed with carbon dioxide and 4 parts of 0.1 N-aqueous ceric ammonium nitrate and 4 parts of molar nitric acid were then added. Polymerization was carried out at room temperature (25° C.) for 45 minutes and then the polymer was precipitated by pouring the reaction mixture into an excess of acetone. After drying for 16 hours at 80° C. in vacuo, a yield of 8.99 parts was obtained which was equivalent to a 79.8% conversion.

Fractional precipitation of the graft copolymer in a 50:50 by volume methanol-water system was achieved by incremental additions of acetone. This procedure yielded sharp fractions containing from 57 to 60% of polyacrylamide to 43 to 40% of polyvinyl alcohol and some free polyvinyl alcohol. No polyacrylamide was to be obtained.

*Example 22*

Five parts of methyl acrylate, inhibitor free, were added to 100 parts of distilled water containing 5 parts of polyvinyl alcohol (Elvanol 51.05). To this solution 10 parts of 0.1 N-aqueous ceric ammonium nitrate containing 1 part of molar nitric acid was added. The reaction container was flushed with carbon dioxide and the polymerization was carried out at room temperature for 75 minutes.

The resulting latex was poured into an excess of 1:4 hexane-ethanol solution to precipitate the graft polymer. Thereafter, the graft polymer was filtered and dried at 50° C. in vacuo for 16 hours. The yield of graft polymer was 9.62 parts and represented a conversion of 92.4%. The graft polymer was insoluble in acetone and in benzene, although it swelled in both solvents.

The graft copolymer was not cross-linked because acetylation in a mixture of acetic acid and acetic anhydride at 60° C. brought it into solution. The acetylated graft copolymer was soluble in acetone.

Two parts of the resulting graft polymer upon extraction for 4 hours with boiling acetone suffered a loss in weight of 0.04 part. Further extraction in boiling acetone for 20 hours caused an additional loss in weight of 0.015 part.

The grafting efficiency of the system, as defined above, was determined by dividing the amount of polymethyl acrylate which was insoluble by the total amount present before extraction. Assuming that the graft is completely insoluble in acetone and that the polymer extracted is pure polymethyl acrylate, the efficiency of the illustrated graft copolymerization of this system was 97%. To further illustrate the difference between graft copolymers and mechanical mixtures, a mechanical mixture containing 1 part of polymethyl acrylate and 1 part of polyvinyl alcohol was extracted for 4 hours in boiling acetone. Under these conditions, 98% of the polymethyl acrylate was extracted.

*Example 23*

Acrylonitrile was steam distilled over 5% phosphoric acid, dried over sodium sulfate and distilled under nitrogen. Three samples of the sizes represented in the table below were then added to aqueous solutions containing the reducing agents set forth in the table below in the proportions reported therein. Ceric ammonium nitrate and nitric acid were then added. The solutions were flushed with carbon dioxide and then polymerized at room temperature for the required period of time.

| Ceric Nitrate, Moles | Reducing Agent, Parts | Acrylonitrile, Parts | Water, Parts | pH | Time, Min. | Percent Conv. |
|---|---|---|---|---|---|---|
| $5 \times 10^{-4}$ | 2.5 PVA [1] | 2.5 | 50 | 1 | 45 | 85.3 |
| $2 \times 10^{-4}$ | 0.5 PVA [1] | 9.5 | 200 | 1.5 | 120 | 73.8 |
| $1 \times 10^{-3}$ | 0.5 Methocel [2] | 9.5 | 200 | 1 | 105 | 70.1 |

[1] Polyvinyl alcohol, Elvanol 51.05.
[2] Methocel (a commercially available methyl cellulose having an absolute viscosity of 15 cps. and a methoxy content of 27.5 to 32.0%).

These graft copolymers are insoluble in dimethyl formamide, ethylene carbonate, and concentrated solutions of potassium thiocyanate. The graft copolymers swell up to 100 times their original volume when heated in the presence of dimethyl formamide but when extracted with dimethyl formamide in a Soxhlet extractor for 24 hours only a very small amount of polyacrylonitrile was found in the solvent.

*Example 24*

0.88 part of polyvinyl alcohol (Elvanol 70.05, a commercially available completely hydrolyzed polyvinyl alcohol having an average number of molecular weight of 10,000) was dissolved in 8.8 parts of water. To this solution was added 5.3 parts of acrylonitrile and 6.6 parts of N-sodium hydroxide solution. Cyanoethylation was carried out at 25° C. for 2 hours. The resulting polyvinyl alcohol was 34% cyanoethylated.

The mixture was diluted with 50 parts of water and acidified to pH 1.5 with N-nitric acid and $2 \times 10^{-4}$ moles of ceric ammonium nitrate were added. Polymerization was carried out at room temperature for 30 minutes. The graft copolymer was filtered and dried in vacuo at 70° C. to yield 5.5 parts of graft copolymer.

The graft was soluble in 60% (by weight) of potassium thiocyanate solution.

*Example 25*

Five parts of polyvinyl alcohol were dissolved in 100 parts of water in a three-neck flask fitted with nitrogen inlet, stirrer and condenser. To this solution was added 22.5 parts of styrene and 5 parts of 0.1 N-ceric sulfate in 1 N-sulfuric acid. The solution was stirred at 40° C. for 30 minutes and then 1 part of Aerosol MA (a sodium dihexyl sulfo-succinate) was added.

Polymerization was carried out for 5 hours at 40° C. The latex was coagulated by pouring into acetone and the polymer was filtered and dried. The total yield of polymer was 22 parts. The polystyrene graft on polyvinyl alcohol was insoluble in benzene.

While the above examples deal generally with the initiation of polymerization and a process for producing graft copolymers and the like, a particularly advantageous facet of the present invention is the application of its principles to a system in which cellulosic materials function as what has been hereinabove referred to as the polymeric reducing agent.

By cellulosic materials hereinabove referred to, fibers, fabrics or paper or other materials composed of cotton, linen, viscose, rayon, wood, paper, pulp or the like, or mixtures or blends thereof are intended to be included.

Although the polymerization of olefinic monomers within the fibers of cellulosic materials has been disclosed heretofore, the methods used have several limitations. The most serious of these is the simultaneous polymerization of monomers in the treatment bath and on the surface of the cellulosic material, as well as within the fibers of the material. This results in a waste of monomer as well as an objectionable layer of polymer on the surface of the material which is often difficult to remove. A distinct advantage of this invention is that polymerization can be made to occur substantially entirely within the fibers of the cellulosic material. In addition, the polymer thus deposited is grafted to the cellulose molecules and becomes an integral part of the material.

The following examples are given as a means of illustrating this aspect of the present invention.

*Example 26*

Five samples of 80 x 80 cotton percale were treated with aqueous solutions containing varying concentrations of acrylonitrile, ceric ammonium nitrate, and nitric acid. The liquor to fabric ratio was at least 30:1 and the temperature was 30° C. in all instances. Upon completion of the treatment, the fabric was thoroughly washed in order to completely remove any traces of nitric acid before drying.

| Acrylonitrile Concentration, Percent | Ceric Ion Concentration (molar) | Nitric Acid Concentration (molar) | Time of Treatment (minutes) | Weight Increase of Fabric, Percent |
|---|---|---|---|---|
| 4 | 0.0002 | 0.01 | 30 | 8.4 |
| 4 | 0.001 | 0.01 | 30 | 18.3 |
| 4 | 0.005 | 0.05 | 5 | 20.3 |
| 4 | 0.005 | 0.05 | 10 | 26.4 |
| 7 | 0.005 | 0.25 | 30 | 39.3 |

*Example 27*

A sample of viscose rayon challis, weighing 6.71 parts was treated with 12 parts of acrylonitrile, 15 parts of 0.1 molar ceric ammonium nitrate, 13.5 parts of 1.0 N nitric acid and 256 parts of water for 30 minutes at 30° C. The solution was flushed with carbon dioxide to render it oxygen-free.

The fabric was thoroughly washed after treatment and then dried at 107° C. for 10 minutes prior to weighing. After treatment, washing and drying, the fabric weighed 8.93 parts, indicating a weight increase of 33.1%.

*Example 28*

Four samples of 80 x 80 cotton percale were treated with aqueous solutions containing varying concentrations of acrylamide and fixed concentrations of ceric ion as ceric ammonium nitrate and fixed concentrations of nitric acid, the composition and concentration of the components being given in the table set forth hereinbelow. The liquor to fabric ratio was at least 30:1 and the treatment was continued for 30 minutes at 30° C. in all instances. A carbon dioxide atmosphere was maintained over the polymerization bath at all times to render is oxygen-free. Upon completion of the treatment, the fabirc was thoroughly washed in several changes of water to insure complete removal of nitric acid before drying. The fabric samples were then dried for 10 minutes at 107° C. before weighing.

| Acrylamide Concentration, Percent | Ceric Ion Concentration (molar) | Nitric Acid Concentration (Normal) | Time of Treatment (minutes) | Weight Increase of Fabric, Percent |
|---|---|---|---|---|
| 1.0 | 0.001 | 0.01 | 30 | 3.9 |
| 1.5 | 0.001 | 0.01 | 30 | 6.5 |
| 2.5 | 0.001 | 0.01 | 30 | 12.5 |
| 4.0 | 0.001 | 0.01 | 30 | 17.6 |

*Example 29*

A sample of 80 x 80 cotton percale, weighing 6.26 parts was treated with a solution containing 10 parts of methyl acrylate, 2.5 parts of a 0.1 molar ceric ammonium nitrate in 1.0 N HNO₃, 10 parts of 1.0 N nitric acid and 225 parts of water for 30 minutes at 25° C. A carbon dioxide atmosphere was maintained over the polymerization bath.

The final weight of the fabric was 11.85 parts, corresponding to a weight increase of about 88%.

*Example 30*

A sample of viscose rayon challis, weighing 6.73 parts was treated with a solution consisting of 5 parts of methylene bis acrylamide, 5 parts of 0.1 molar ceric ammonium nitrate in 1 N HNO₃, 10 parts of 1 N nitric acid and 230 parts of water for 30 minutes at 30° C. Atmosphere of carbon dioxide was maintained over the polymerization bath.

The final weight of the fabric was 7.71 parts, indicating a weight increase of 14.5%.

*Example 31*

A sample of 80 x 80 cotton percale was treated according to the procedure described in Example 28 (Sample 2) to deposit polyacrylamide within the fiber of the fabric. The polymer deposit was equal to 7% of the initial weight of the material. The fabric was then treated for 10 minutes with a 37% formalin solution at 85° C. and at a liquor to cloth ratio of 7:1.

After thorough washing to remove excess formaldehyde, and subsequent drying, the fabric was padded through a 3% solution of magnesium chloride catalyst, and then heated to 175° C. for 100 seconds. The wrinkle recovery as determined by the Monsanto wrinkle recovery test method of the treated fabric was 262° compared to 142° for the untreated. The treatment resulted in a tensile strength loss of 32%.

A wrinkle recovery of 250° can be obtained by treating cotton with formaldehyde alone under acid conditions. The tensile strength loss of the treated fabric, however, is of the order of 70% that of an untreated fabric.

*Example 32*

A sample of cellulosic filter paper was treated for 5 minutes at 30° C. with a 7% solution of acrylonitrile, 0.005 molar concentration of ceric ion as ceric ammonium nitrate, and 0.05 N nitric acid solution. The solution was flushed with carbon dioxide to render oxygen-free. Thereafter, the sample of filter paper was thoroughly washed with water and dried to give a weight increase of 45%.

The treated paper was cut into small fragments and treated with 200 times its weight of 1.0 molar cupriethylene diamine solution for 20 hours at room temperature. The paper was largely unaffected by the reagent and after washing and drying was found to have lost less than 5% of its weight. The untreated paper subjected to the same solvent action was completely dissolved in less than 6 hours.

The treated paper was then extracted with dimethyl formamide at temperatures of between 70 and 80° C. for 16 hours. The dimethyl formamide remained perfectly clear upon dilution with water, indicating that no free polyacrylonitrile was extracted.

The treated paper showed outstanding resistance to acid and alkali degradation. A sample of paper was immersed for 8 hours in concentrated hydrochloric acid and did not disaggregate or lose its strength. A similar sample remained unchanged when treated for 8 hours with 4% sodium hydroxide at 80° C.

Identical paper samples which have not been treated according to the process set forth above has a tensile strength of 10 pounds when dry and 0 when wet, while paper so treated has a tensile strength of 34 pounds when dry and 28 pounds when wet.

*Example 33*

Five parts of Carbowax 6000 ( a commercially available polyethylene glycol having a molecular weight of about 6,000) was dissolved in 100 parts of water containing 5 parts of acrylonitrile. To this solution was added $8 \times 10^{-4}$ mole of ceric ammonium nitrate and sufficient nitric acid to adjust the pH to 1. The solution was flushed with carbon dioxide and polymerized for 145 minutes at room temperature. The resulting polymer was coagulated, filtered and extracted twice with water at reflux for five hours. The resulting oligo block copolymer contained 89.2% of acrylonitrile and 10.8% Carbowax 6000.

This example is illustrative of an oligo block copolymer in which the preformed polymeric reducing agent (polyethylene glycol) and acrylonitrile are reacted in the presence of a ceric compound. Copolymers of this type may be spun from aqueous potassium thiocyanate and used in the preparation of synthetic fibers.

*Example 34*

15 parts of acrylonitrile and 5 parts of polyvinylamine, prepared from polyacrylamide by Hoffman degradation, were dissolved in 300 parts of water at 25° C. After flushing with nitrogen, the solution was acidified to pH 1.5 with nitric acid and 0.6 part of ceric ammonium nitrate was added. Polymerization started within one minute. After 70 minutes, the polymer dispersion was poured into an excess of acetone and the graft polymer separated by filtration. The yield was 17 parts and represented a 75% conversion of the acrylonitrile.

*Example 35*

A mixture of 100 parts of water, 5 parts of Aerosol MA, 40 parts of styrene and 10 parts of acrolein was emulsified by stirring in a suitable reaction vessel. After displacing the air in the vessel with nitrogen, 0.2 part of potassium persulfate was added. Polymerization was carried out for 3.5 hours at 50° C. at which time the conversion of monomer to polymer was approximately 80%. The latex, after stripping the excess monomer under vacuum, contained 23% of styrene-acrolein copolymer.

80 parts of the above latex was diluted with 80 parts of water in a reaction vessel equipped with a mechanical stirrer. A solution of 0.5 part of ceric dihexyl sulfosuccinate in 25 parts of ethyl acrylate was added to the emulsion at 30° C. over a period of 1 hour. Upon completion of the addition, the temperature of the reaction mixture was raised to 40° C. and maintained at that temperature for 5 hours. The latex was coagulated with methanol to give 36 parts of graft copolymer, which represented a 70% conversion of the ethyl acrylate.

*Example 36*

A solution of 1 part of polyvinyl pyrrolidone and 6.5 parts of acrylonitrile in 100 parts of water was flushed with nitrogen and cooled to 20° C. Two parts of an 0.1 N solution of ceric ammonium nitrate in molar nitric acid were added. Polymerization started immediately. After two hours, the mixture was slurried with 200 parts of acetone and the polymer separated by filtration. The yield was 6.05 part and represented a conversion of 77.5%.

Materials most suitable for the preparation of linear oligo block copolymers are those having a central organic chain which has functional terminal groups such as hydroxy, mercapto, aldehydic, amino, keto, acetal groups, as for example, polyethylene glycol, being generically written as $HOC_2H_4O-(C_4H_8O)_n-C_2H_4OH$, wherein $n$ is 0 or a positive integer. These compounds range in molecular weight from a few hundred to many thousands, as for example, 4,000 and 6,000 or more. In addition to the above-mentioned materials, the polyethylene imines are also satisfactory for the preparation of the linear oligo block copolymer.

While the detailed mechanism by which the process of this invention operates and the resulting advantages that are produced are not fully known, the ceric ion redox system initiates polymerization of suitable unsaturated monomers through a free radical mechanism according to the following general formula where the polymeric reducing agent is a polymeric alcohol:

$$Ce^{4+} + -\overset{OH}{\underset{|}{C}}-H = Ce^{3+} + -\overset{OH}{\underset{|}{C}}\cdot + H^+$$

wherein $$HO-\overset{|}{\underset{|}{C}}\cdot$$

is the free radical capable of reacting with suitable unsaturated monomers. The oxidation reaction proceeds through a single electron transfer mechanism, the reducing agent donating one electron to the oxidizing agent and the free radical being located on the polymeric organic reducing agent. This is important in that it initiates polymerization on a given reducing agent, i.e., a preformed polymeric chain material, at the situs of the carbon atoms having the free radicals thereon, which is believed to be the carbon atom in the $$HO-\overset{|}{\underset{|}{C}}-H$$

group hereinabove described. The grafted polymer chain is thus attached to the reducing agent through a carbon linkage, i.e., the polymer P, is attached to the central organic chain as $$HO-\overset{|}{\underset{|}{C}}-P$$

Polymerization of unsaturated monomers in the presence of ceric ion and performed polymer chains or backbones such as cellulose, starch, polyvinyl alcohol, which may contain a multiplicity of $$HO-\overset{|}{\underset{|}{C}}-H$$

groups and may therefore be termed polyfunctional reducing agents, are believed to produce graft copolymers according to the following equations:

$$-CH_2-\underset{\underset{OH}{|}}{CH}-CH_2-\underset{\underset{OH}{|}}{CH}- + Ce^{4+} =$$

$$-CH_2-\underset{\underset{OH}{|}}{\overset{\cdot}{C}}-CH_2-\underset{\underset{OH}{|}}{CH}- + H^+ + Ce^{3+}$$

The free radical on the preformed polymer chain (reducing agent) is then believed to react with a given monomer (M) to produce a graft copolymer as follows:

$$-CH_2-\underset{\underset{\underset{\underset{M}{|}}{\underset{M}{|}}}{\underset{M}{|}}}{\overset{OH}{\underset{|}{C}}}-CH_2-\underset{\underset{OH}{|}}{CH}-$$

Graft copolymers may, of course, be prepared by conventional methods which take advantage of the chain transfer reaction between growing polymer chains and the backbone. However, the yields of graft copolymers obtained are low and are a function of the degree of conversion. Other methods take advantage of catalysts like persulfates and peroxides, which under certain conditions may attack the backbone to produce free radicals. In these cases, however, a mixture of homopolymers and graft copolymers are obtained, because conventional initiators activate the monomer as well as the backbone.

With ceric salts in the redox system of the present invention, the graft copolymers are substantially free of homopolymers, because the backbones are attacked very rapidly at relatively low temperatures, while the monomers are not.

Heretofore, it has been considered impossible to prepare graft copolymers essentially free of homopolymers even with elaborate and impractical processes. The process described herein give graft copolymers essentially free of homopolymers as one of its major advantages. That is, by this process a substantially pure graft copolymer may be produced.

The advantages of graft copolymers over mixed copolymers is well known. For example, the solvent resistance of graft copolymers is much improved over that of mixtures of polymers. As is shown in Example 32 above, the grafted copolymer of acrylonitrile on cellulose is insoluble in the solvents for either polyacrylonitrile or for cellulose.

The absence of free backbone polymer in the polymerization product can be assured by incorporating sufficient ceric salt in the reaction mixture to give at least one reactive site on each backbone molecule. Obviously, the higher the molecular weight of the backbone polymer, the less ceric salt will be required to give this one reactive site per molecule.

It can readily be seen that the properties of a backbone may be readily and widely varied by employing the process of the present invention. Three types of graft copolymers may be made by this method. First, a homopolymer chain may be grafted to a backbone in accordance with the following general formula wherein A represents a given backbone and B a polymer chain grafted thereon:

$$\begin{array}{c}A-A-A-A-A\\|\\B\\|\\B\\|\\B\\|\\B\end{array}$$

Secondly, two different homopolymer chains may be grafted onto a given backbone as by two successive operations of this invention, in accordance with the following general formula wherein A represents a given backbone and B and C different polymer chains grafted thereon:

$$\begin{array}{ccc}A-A-A-A-A\\|&&|\\B&&C\\|&&|\\B&&C\\|&&|\\B&&C\\|&&\\B&&\end{array}$$

Thirdly, a copolymer chain can be grafted onto a given back-bone, when two suitable monomers are utilized in accordance with the following general formula wherein A represents a given backbone and —B—C—B— a given copolymer. In this instance, C may be a monomer which cannot homopolymerize.

$$\begin{array}{c}A-A-A-A-A\\|\\B\\|\\C\\|\\B\\|\\C\end{array}$$

By proper selection of monomer or monomers, melting point temperatures, water-proofing characteristics and moldability of a polymer may be suitably modified.

The next example illustrates how a monomeric material can be grafted onto a graft copolymer.

*Example 37*

Into a suitable reaction vessel containing 2.4 parts of a 50–50 graft copolymer of polyvinyl alcohol and polyacrylamide, there is added 4.8 parts of methyl acrylate. The solution is flushed with carbon dioxide and then 4 parts of 0.1 N ceric ammonium nitrate in 0.1 N nitric acid are added. The polymerization is carried out for about 1 hour at room temperature (25° C.). The resulting polymeric material is precipitated in an excess of methanol, filtered and dried in vacuo at 50° C. The total yield is 6.75 parts representing a conversion of 94%. The mixed graft copolymer is essentially insoluble in water, acetone and benzene.

The following example illustrates how two monomeric polymerizable materials may be grafted simultaneously onto a polymeric backbone.

Example 38

Into a suitable reaction vessel containing 5 parts of polyvinyl alcohol (Elvanol 51.05) dissolved in 100 parts of distilled water, there is added 5 parts of acrylamide, 5 parts of methyl acrylate and 4 parts of 0.1 N ceric ammonium nitrate in 1.0 N nitric acid. Copolymerization is carried out for 20 minutes at room temperature. The resulting suspension is precipitated with an excess of ethanol. The graft copolymer thus produced is filtered and dried in vacuo at 70° C. The total yield is 14.8 parts. The graft copolymer thus produced is insoluble in acetone but is easily dispersible in water.

Several methods of preparation of block copolymers have been described heretofore. Their synthesis requires the preparation of individual block polymers containing reactive groups at both ends and a subsequent joining of these blocks through a second step. Most second steps involve the condensation of these preformed blocks.

When unsaturated monomers are polymerized in the presence of ceric ions and suitable reducing agents, such as trimethylene glycol, 1,4-butanediol and the like polymer molecules containing hydroxyl groups on one or both ends, depending upon the termination reaction, are believed to be formed. These polymers can then be reacted further as a polymeric reducing agent with another monomer in the presence of ceric ions to produce a copolymer consisting of a few long sequences of the two monomers. These linear oligo block copolymers are substantially different from the block copolymers previously described because the physical properties of a block copolymer are a function of the length and number of sequences.

Copolymers prepared from hydrophobic and hydrophilic blocks show peculiar solubility characteristics and can be used as surface active agents. Graft copolymers can also be used as adhesives and bonding agents for non-woven fabrics and for pigments.

It will be noted in the above examples, and particularly with regard to Examples 27–33 relative to the graft polymerization of suitable monomers on the cellulosic backbones of materials such as cotton fabric, regenerated cellulose fabric, viscose rayon fabric, paper, paper pulp, wood, wood pulp, and the like, that certain advantages of the present process, namely its ability to operate at low temperatures, and more specifically room temperature, and the fact that excessive loss of monomer due to homopolymerization in the bath are obviated. This is particularly evident with regard to Example 33, wherein the graft polymer was insoluble in both cupridiethylene diamine and dimethyl foramide, indicating that the cellulose molecule was modified and that no free polyacrylonitrile was present. This is believed to indicate clearly that the polyacrylonitrile is grafted onto the cellulosic backbones of the material.

By employing the process of the present invention, wherein the reducing agent is cellulose or cellulosic materials, the properties of said materials may be varied to impart greater utility heretofore unobtainable. By the process of the present invention, new finishes for fibers may be obtained, dyes and finishes may be rendered more durable on both fabric and paper. Surface characteristics of metals may be modified, now rubber-soluble polymers may be produced, new modifiers, additives and plasticizers for plastics and resins may be produced. Pigment of improved bleed resistance and new pigment bonding agents may be produced. Protein and proteinaceous materials may be modified to improve existing properties or to impart new properties thereto. With regard to textiles and textile materials, in addition to providing a means of preparing more durable finishes and new finishes for fabrics, fibers and fabric may be rendered more resistant to fire, shrinkage, rot, acids, mildew, and the like. In addition, their tensile strength and wrinkle resistance, and the like, may be improved.

With suitable reducing agents, new classes of surface active agents may be readily prepared. Thus, for example, polymers possessing hydrophilic characteristics may be readily grafted onto a suitable backbone, as for example, at a second point thereon. In addition, new lubricating oil additives may be developed and properties of existing ones improved. In many instances, the polymerization products of the present invention may be further coreacted with various resins, including amino resins, such as urea-formaldehyde condensates, triazine formaldehyde condensates of various ethylene ureas, or the alkylated derivatives of these materials to achieve a wide variety of desired end properties, particularly in the fields of textile and paper chemistry.

The above-enumerated potential uses of the concepts of the present invention are only a relatively few of the many which will readily occur to those skilled in various arts.

We claim:

1. A process comprising polymerizing a polymerizable monomeric compound containing a polymerizably reactive $CH_2=C<$ group in an aqueous medium at a pH not greater than 3.5 in the presence of a ceric salt which is soluble in at least one component of the reaction medium, and an organic reducing agent which is capable of being oxidized by said ceric salt and which is capable of initiating the polymerization, wherein the only reducing agent is an organic reducing agent.

2. A process comprising polymerizing a polymerizable monomeric compound containing a polymerizably reactive $CH_2=C<$ group in an aqueous medium at a pH not greater than 3.5 in the presence of a ceric salt which is soluble in at least one component of the reaction medium, and a monomeric organic reducing agent which is capable of being oxidized by said ceric salt and which is capable of initiating the polymerization, wherein the only reducing agent is an organic reducing agent.

3. A process comprising polymerizing a polymerizable monomeric compound containing a polymerizably reactive $CH_2=C<$ group dissolved at least partially in an aqueous medium at a pH not greater than 3.5 in the presence of a ceric salt which is soluble in at least one component of the reaction medium, and a monomeric organic reducing agent which is capable of being oxidized by said ceric salt and which is capable of initiating the polymerization, wherein the only reducing agent is an organic reducing agent.

4. A process comprising polymerizing a polymerizable monomeric compound containing a polymerizably reactive $CH_2=C<$ group dissolved at least partially in an aqueous medium at a pH not greater than 3.5 and in the presence of a ceric salt which is soluble in at least one component of the reaction medium, and a monomeric aldehyde which is capable of being oxidized by said ceric salt and which is capable of initiating the polymerization wherein said aldehyde is the sole reducing agent.

5. A process comprising polymerizing a polymerizable monomeric compound containing a polymerizably reactive $CH_2=C<$ group dissolved at least partially in an aqueous medium at a pH not greater than 3.5 and in the presence of a ceric salt which is soluble in at least one component of the reaction medium, and monomeric acetaldehyde wherein said acetaldehyde is the sole reducing agent.

6. A process comprising polymerizing acrylamide dissolved in an aqueous medium at a pH not greater than 3.5 and in the presence of a ceric salt which is soluble in at least one component of the reaction medium and acetaldehyde wherein said acetaldehyde is the sole reducing agent.

7. A process comprising polymerizing acrylamide dissolved in an aqueous medium at a pH not greater than 3.5 and in the presence of a ceric salt which is soluble in at least one component of the reaction medium and monomeric acetaldehyde, as an organic reducing agent, wherein the only reducing agent is an organic reducing agent.

8. A process comprising polymerizing a polymerizable monomeric compound containing a polymerizably reactive $CH_2=C<$ group dissolved at least partially in an aqueous medium at a pH not greater than 3.5 and in the presence of a ceric salt which is soluble in at least one component of the reaction medium, and a monomeric mercaptan which is capable of being oxidized by said ceric salt and which is capable of initiating the polymerization wherein said mercaptan is the sole reducing agent.

9. A process comprising polymerizing a polymerizable monomeric compound containing a polymerizably reactive $CH_2=C<$ group dissolved at least partially in an aqueous medium at a pH not greater than 3.5 and in the presence of a ceric salt which is soluble in at least one component of the reaction medium and tertiary butyl mercaptan wherein said mercaptan is the sole reducing agent.

10. A process comprising polymerizing methyl acrylate dissolved in an aqueous medium at a pH not greater than 3.5 and in the presence of a ceric salt which is soluble in at least one component of the reaction medium and tertiary butyl mercaptan wherein said mercaptan is the sole reducing agent.

11. A process comprising polymerizing a polymerizable monomeric compound containing a polymerizably reactive $CH_2=C<$ group dissolved at least partially in an aqueous medium at a pH not gretaer than 3.5 and in the presence of a ceric salt which is soluble in at least one component of the reaction medium, and a monomeric amine which is capable of being oxidized by said ceric salt and which is capable of initiating the polymerization wherein said amine is the sole reducing agent.

12. A process comprising polymerizing a polymerizable monomeric compound containing a polymerizably reactive $CH_2=C<$ group dissolved at least partially in an aqueous medium at a pH not greater than 3.5 and in the presence of a ceric salt which is soluble in at least one component of the reaction medium and ethylene diamine wherein said diamine is the sole reducing agent.

13. A process comprising polymerizing acrylonitrile in an aqueous medium at a pH not greater than 3.5 and in the presence of a ceric salt which is soluble in at least one component of the reaction medium and ethylene diamine wherein said diamine is the sole reducing agent.

14. A process comprising polymerizing in an aqueous emulsion a polymerizable monomeric compound containing a polymerizably reactive $CH_2=C<$ group at a pH not greater than 3.5 and in the presence of a ceric salt which is soluble in at least one component of the reaction medium and a monomeric organic reducing agent which is capable of being oxidized by said ceric salt and which is capable of initiating the polymerization, wherein the only reducing agent is an organic reducing agent.

15. A process comprising polymerizing in an aqueous emulsion a polymerizable monomeric compound containing a polymerizably reactive $CH_2=C<$ group at a pH not greater than 3.5 and in the presence of a ceric salt which is soluble in at least one component of the reaction medium and a monomeric alcohol which is capable of being oxidized by said ceric salt and which is capable of initiating the polymerization wherein said alcohol is the sole reducing agent.

16. A process comprising polymerizing in an aqueous emulsion a polymerizable monomeric compound containing a polymerizably reactive $CH_2=C<$ group at a pH not greater than 3.5 and in the presence of a ceric salt which is soluble in at least one component of the reaction medium and a monomeric polyhydric alcohol which is capable of being oxidized by said ceric salt and which is capable of initiating the polymerization wherein said alcohol is the sole reducing agent.

17. A process comprising polymerizing in an aqueous emulsion a polymerizable monomeric compound containing a polymerizably reactive $CH_2=C<$ group at a pH not greater than 3.5 and in the presence of a ceric salt which is soluble in at least one component of the reaction medium and propylene glycol wherein said glycol is the sole reducing agent.

18. A process comprising polymerizing in an aqueous emulsion, styrene at a pH not greater than 3.5 and in the presence of a ceric salt which is soluble in at least one component of the reaction medium and propylene glycol wherein said glycol is the sole reducing agent.

19. A process comprising polymerizing in an aqueous emulsion a polymerizable monomeric compound containing a polymerizably reactive $CH_2=C<$ group at a pH not greater than 3.5 and in the presence of a ceric salt which is soluble in at least one component of the reaction medium and a monomeric ketone which is capable of being oxidized by said ceric salt and which is capable of initiating the polymerization wherein said ketone is the sole reducing agent.

20. A process comprising polymerizing in an aqueous emulsion a polymerizable monomeric compound containing a polymerizably reactive $CH_2=C<$ group at a pH not greater than 3.5 and in the presence of a ceric salt which is soluble in at least one component of the reaction medium and a monomeric acetoacetic ester which is capable of being oxidized by said acid salt and which is capable of initiating the polymerization wherein said acetoacetic ester is the sole reducing agent.

21. A process comprising polymerizing in an aqueous emulsion a polymerizable monomeric compound containing a polymerizably reactive $CH_2=C<$ group at a pH not greater than 3.5 and in the presence of a ceric salt which is soluble in at least one component of the reaction medium and ethyl acetoacetate wherein said acetoacetate is the sole reducing agent.

22. A process comprising polymerizing in an aqueous emulsion, chloroprene at a pH not greater than 3.5 in the presence of a ceric salt which is soluble in at least one component of the reaction medium and ethyl acetoacetate wherein said acetoacetate is the sole reducing agent.

23. A process for preparing graft copolymers comprising polymerizing a polymerizable monomeric compound containing a polymerizably reactive $CH_2=C<$ group in an aqueous medium at a pH not greater than 3.5 in the presence of a ceric salt which is soluble in at least one component of the reaction medium and a polymeric organic reducing agent which is capable of being oxidized by said ceric salt and which is capable of initiating the polymerization.

24. A process for preparing graft copolymers comprising polymerizing a polymerizable monomeric compound containing a polymerizably reactive $CH_2=C<$ group in an aqueous medium at a pH not greater than 3.5 in the presence of a ceric salt which is soluble in at least one component of the reaction medium and a polymeric alcohol which is capable of being oxidized by said ceric salt and which is capable of initiating the polymerization.

25. A process for preparing graft copolymers comprising polymerizing a polymerizable monomeric compound containing a polymerizably reactive $CH_2=C<$ group dissolved at least partially in an aqueous medium at a pH not greater than 3.5 in the presence of a ceric salt which is soluble in at least one component of the reaction medium and a polymeric alcohol which is capable of being oxidized by said ceric salt and which is capable of initiating the polymerization.

26. A process for preparing graft copolymers comprising polymerizing a polymerizable monomeric compound containing a polymerizably reactive $CH_2=C<$ group dissolved at least partially in an aqueous medium at a pH not greater than 3.5 in the presence of a ceric salt which is soluble in at least one component of the reaction medium and a cellulosic material which is capable of being oxidized by said ceric salt and which is capable of initiating the polymerization.

27. A process for preparing graft copolymers comprising polymerizing a polymerizable monomeric compound containing a polymerizably reactive $CH_2=C<$ group dissolved at least partially in an aqueous medium at a pH not greater than 3.5 in the presence of a ceric salt which is soluble in at least one component of the reaction medium and cellulose.

28. A process for preparing graft copolymers comprising polymerizing a polymerizable monomeric compound containing a polymerizably reactive $CH_2=C<$ group dissolved at least partially in an aqueous medium at a pH not greater than 3.5 in the presence of a ceric salt which is soluble in at least one component of the reaction medium and cotton.

29. A process for preparing graft copolymers comprising polymerizing acrylonitrile dissolved in an aqueous medium at a pH not greater than 3.5 in the presence of a ceric salt which is soluble in at least one component of the reaction medium and cotton.

30. A process for preparing graft copolymers comprising polymerizing, in an aqueous emulsion, a polymerizable monomeric compound containing a polymerizably reactive $CH_2=C<$ group in an aqueous medium at a pH not greater than 6.0 in the presence of a ceric salt which is soluble in at least one component of the reaction medium and a polymeric alcohol which is capable of being oxidized by said ceric salt and which is capable of initiating the polymerization.

31. A process for preparing graft copolymers comprising polymerizing, in an aqueous emulsion, a polymerizable monomeric compound containing a polymerizably reactive $CH_2=C<$ group in an aqueous medium at a pH not greater than 3.5 in the presence of a ceric salt which is soluble in at least one component of the reaction medium and a polyvinyl alcohol.

32. A process for preparing graft copolymers comprising polymerizing, in an aqueous emulsion, styrene at a pH not greater than 3.5 in the presence of a ceric salt which is soluble in at least one component of the reaction medium and polyvinyl alcohol.

33. A process for preparing graft copolymers comprising polymerizing a polymerizable monomeric compound containing a polymerizably reactive $CH_2=C<$ group dissolved at least partially in an aqueous medium at a pH not greater than 3.5 in the presence of a ceric salt which is soluble in at least one component of the reaction medium and a polymeric organic reducing agent which is capable of being oxidized by said ceric salt and which is capable of initiating the polymerization.

34. A process for preparing graft copolymers comprising polymerizing a polymerizable monomeric compound containing a polymerizably reactive $CH_2=C<$ group dissolved at least partially in an aqueous medium at a pH not greater than 3.5 in the presence of a ceric salt which is soluble in at least one component of the reaction medium and a polymeric ketone which is capable of being oxidized by said ceric salt and which is capable of initiating the polymerization.

35. A process for preparing graft copolymers comprising polymerizing acrylonitrile dissolved in an aqueous medium at a pH not greater than 3.5 and in the presence of a ceric salt which is soluble in at least one component of the reaction medium and polyvinyl pyrrolidone.

36. A process for preparing graft copolymers comprising polymerizing a polymerizable monomeric compound containing a polymerizably reactive $CH_2=C<$ group dissolved at least partially in an aqueous medium at a pH not greater than 3.5 in the presence of a ceric salt which is soluble in at least one component of the reaction medium and a polymeric amine which is capable of being oxidized by said ceric salt and which is capable of initiating the polymerization.

37. A process for preparing graft copolymers comprising polymerizing acrylamide dissolved in an aqueous medium at a pH not greater than 3.5 and in the presence of a ceric salt which is soluble in at least one component of the reaction medium and polyvinyl amine.

38. A process for preparing graft copolymers comprising polymerizing, in an aqueous emulsion, a polymerizable monomeric compound containing a polymerizably reactive $CH_2=C<$ group in an aqueous medium at a pH not greater than 6.0 in the presence of a ceric salt which is soluble in at least one component of the reaction medium and a polymeric organic reducing agent which is capable of being oxidized by said ceric salt and which is capable of initiating the polymerization.

39. A process for preparing graft copolymers comprising polymerizing, in an aqueous emulsion, a polymerizable monomeric compound containing a polymerizably reactive $CH_2=C<$ group in an aqueous medium at a pH not greater than 3.5 in the presence of a ceric salt which is soluble in at least one component of the reaction medium and a polymeric aldehyde which is capable of being oxidized by said ceric salt and which is capable of initiating the polymerization.

40. A process for preparing graft copolymers comprising polymerizing, in an aqueous emulsion, a polymerizable monomeric compound containing a polymerizably reactive $CH_2=C<$ group in an aqueous medium at a pH not greater than 3.5 in the presence of a ceric salt which is soluble in at least one component of the reaction medium and a polymeric aldehyde comprising the copolymer of acrolein and a polymerizable monomeric compound containing a polymerizable $CH_2=C<$ group which is capable of being oxidized by said ceric salt and which is capable of initiating the polymerization.

41. A process for preparing graft copolymers comprising polymerizing, in an aqueous emulsion, methyl acrylate at a pH not greater than 3.5 and in the presence of a ceric salt which is soluble in at least one component of the reaction medium and a polymeric aldehyde comprising a copolymer of acrolein and styrene.

No references cited.

UNITED STATES PATENT OFFICE

CERTIFICATE OF CORRECTION

Patent No. 2,922,768             January 26, 1960

Guido Mino et al.

It is hereby certified that error appears in the above numbered patent requiring correction and that the said Letters Patent should read as corrected below.

In the grant, lines 1, 2 and 3, for "Guido Mino and Samuel Kaizerman, of Plainfield, New Jersey," read -- Guido Mino and Samuel Kaizerman, of Plainfield, New Jersey, assignors to American Cyanamid Company, of New York, N. Y., a corporation of Maine, --;  line 12, for "Guido Mino and Samuel Kaizerman, their heirs" read -- American Cyanamid Company, its successors --;  in the heading to the printed specification, line 6, for "Guido Mino and Samuel Kaizerman, Plainfield, N. J." read -- Guido Mino and Samuel Kaizerman, Plainfield, N. J., assignors to American Cyanamid Company, New York, N. Y., a corporation of Maine --;  column 1, line 26, for "is at least" read -- in at least --;  line 59, for "invention to" read -- invention is --;  column 4, line 40, for "celulose" read -- cellulose --;  line 62, after ethanol" insert a comma;  column 7, line 45, for "sulfomethyl-gulutaric" read -- sulfomethylglutaric --;  column 9, line 24, for "where" read -- were --;  column 17, line 32, for "performed" read -- preformed --;  column 18, line 2, for "give" read -- gives --;  column 21, line 37, for "gretaer" read -- greater --.

Signed and sealed this 28th day of June 1960.

(SEAL)
Attest:

KARL H. AXLINE
Attesting Officer

ROBERT C. WATSON
Commissioner of Patents